(12) United States Patent
Kim et al.

(10) Patent No.: US 10,030,840 B2
(45) Date of Patent: Jul. 24, 2018

(54) ILLUMINATING DEVICE AND VEHICLE LAMP COMPRISING SAME

(71) Applicant: LG INNOTEK CO., LTD., Seoul (KR)

(72) Inventors: Jin Hee Kim, Seoul (KR); Kyu Sung Han, Seoul (KR); Tae Kyung Kim, Seoul (KR); Kwang Ho Park, Seoul (KR); Moo Ryong Park, Seoul (KR); Sang Jun Park, Seoul (KR); Jae Hyuk Jang, Seoul (KR); Youn Mo Jeong, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 323 days.

(21) Appl. No.: 14/432,091

(22) PCT Filed: Sep. 27, 2013

(86) PCT No.: PCT/KR2013/008713
§ 371 (c)(1),
(2) Date: Jul. 21, 2015

(87) PCT Pub. No.: WO2014/051394
PCT Pub. Date: Apr. 3, 2014

(65) Prior Publication Data
US 2015/0338054 A1 Nov. 26, 2015

(30) Foreign Application Priority Data

Sep. 27, 2012 (KR) .................. 10-2012-0108095
Dec. 17, 2012 (KR) .................. 10-2012-0147655
Dec. 17, 2012 (KR) .................. 10-2012-0147656

(51) Int. Cl.
*B60Q 1/00* (2006.01)
*F21V 8/00* (2006.01)
(Continued)

(52) U.S. Cl.
CPC .................. *F21V 5/04* (2013.01); *B60Q 3/64* (2017.02); *B60Q 3/745* (2017.02); *F21S 43/14* (2018.01);
(Continued)

(58) Field of Classification Search
CPC ......... G02B 6/005; B60Q 3/62; F21S 43/245; F21S 43/14; F21S 43/26
See application file for complete search history.

(56) References Cited

U.S. PATENT DOCUMENTS

2004/0004770 A1   1/2004  Ebina et al.
2006/0164840 A1*  7/2006  Song .................. G02F 1/133603
                                                        362/341

(Continued)

FOREIGN PATENT DOCUMENTS

CN    1463388 A     12/2003
CN    101017270 A    8/2007
(Continued)

OTHER PUBLICATIONS

Office Action dated Jun. 23, 2016 in Chinese Application No. 201380061622.9.
(Continued)

*Primary Examiner* — Karabi Guharay
(74) *Attorney, Agent, or Firm* — Saliwanchik, Lloyd & Eisenschenk

(57) ABSTRACT

To implement an illuminating device which can adjust the distribution of light of flat lighting and which also has a superior light concentration function, the illuminating device of the present invention implements flat lighting having a light-concentrating member to maximize light concentration.

16 Claims, 5 Drawing Sheets

(51) Int. Cl.
  *F21V 5/04* (2006.01)
  *F21V 13/04* (2006.01)
  *B60Q 3/64* (2017.01)
  *B60Q 3/74* (2017.01)
  *F21S 43/14* (2018.01)
  *F21S 43/20* (2018.01)
  *F21S 43/239* (2018.01)
  *F21S 43/245* (2018.01)
  *F21S 43/249* (2018.01)

(52) U.S. Cl.
  CPC .......... *F21S 43/239* (2018.01); *F21S 43/245* (2018.01); *F21S 43/249* (2018.01); *F21S 43/26* (2018.01); *F21V 13/04* (2013.01)

(56) References Cited

U.S. PATENT DOCUMENTS

| | | |
|---|---|---|
| 2007/0236940 A1 | 10/2007 | Kuroda et al. |
| 2009/0237916 A1* | 9/2009 | Park ................ G02F 1/133603 362/97.1 |
| 2010/0020566 A1 | 1/2010 | Teng |
| 2010/0214788 A1* | 8/2010 | Kadono ............... C03C 17/006 362/311.01 |
| 2011/0164402 A1 | 7/2011 | Kang et al. |
| 2012/0147277 A1 | 6/2012 | Yamamoto et al. |
| 2012/0212828 A1* | 8/2012 | Cho ..................... G02B 5/0215 359/619 |
| 2012/0300431 A1* | 11/2012 | You ..................... H01L 25/0753 362/84 |
| 2013/0335672 A1 | 12/2013 | Hur et al. |

FOREIGN PATENT DOCUMENTS

| | | |
|---|---|---|
| CN | 201233488 Y | 5/2009 |
| CN | 101487948 A | 7/2009 |
| CN | 101793382 A | 8/2010 |
| CN | 102116443 A | 7/2011 |
| CN | 102207278 A | 10/2011 |
| EP | 2463706 A1 | 6/2012 |
| JP | 2001-345008 A | 12/2001 |
| JP | 2007-047257 A | 2/2007 |
| JP | 2008-277176 A | 11/2008 |
| KR | 20110131044 A | 12/2011 |
| KR | 20120003272 A | 1/2012 |
| KR | 10-2012-0013708 A | 2/2012 |
| KR | 10-2012-0030821 A | 3/2012 |
| TW | 201005336 A | 2/2010 |
| WO | WO-2012/086896 A1 | 6/2012 |

OTHER PUBLICATIONS

Extended European Search Report dated Oct. 11, 2016 in European Application No. 13840484.3.
International Search Report in International Application No. PCT/KR2013/008713, filed Sep. 27, 2013.

* cited by examiner

[FIG. 1]
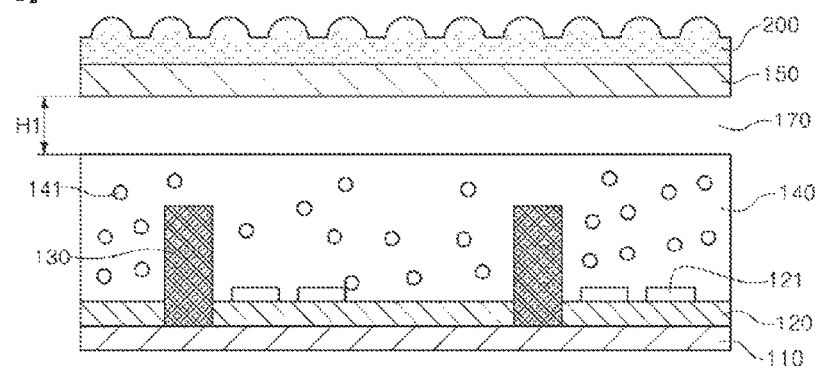
[FIG. 2]
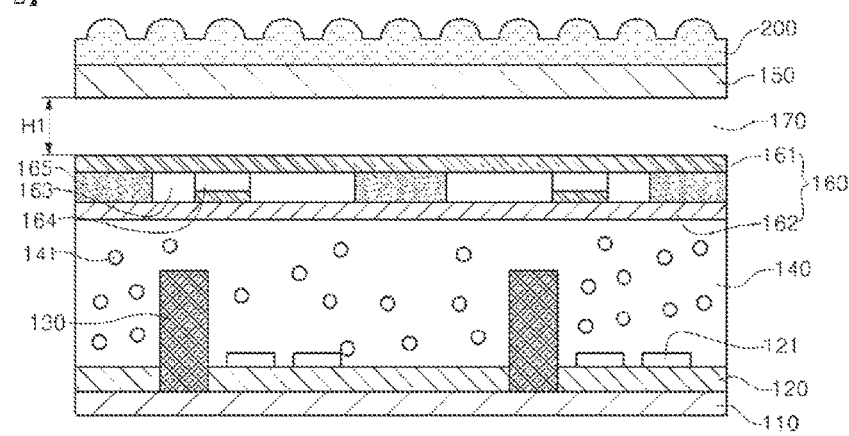
[FIG. 3]
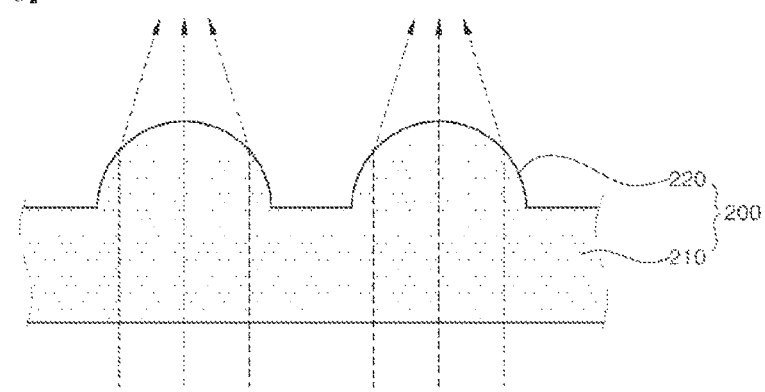

[FIG. 4]
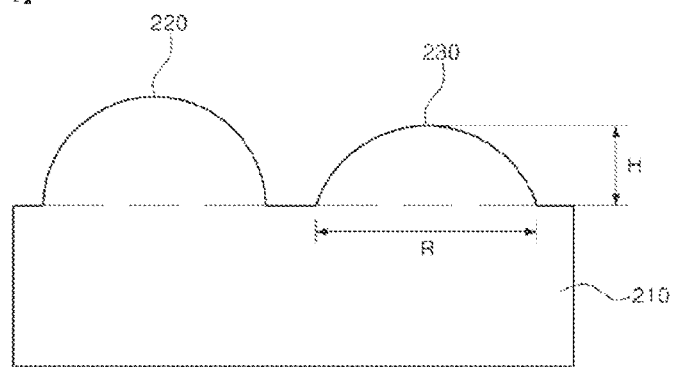
[FIG. 5]
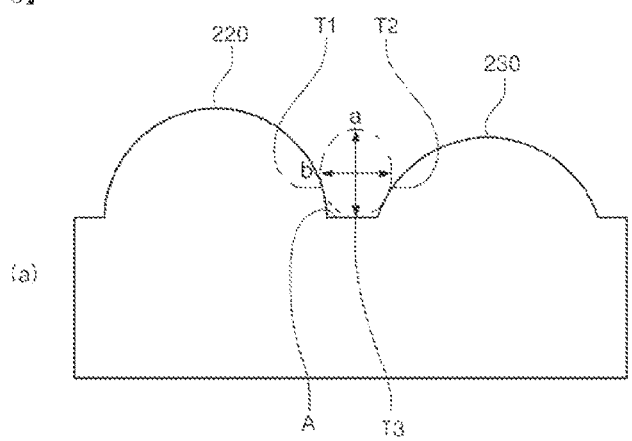
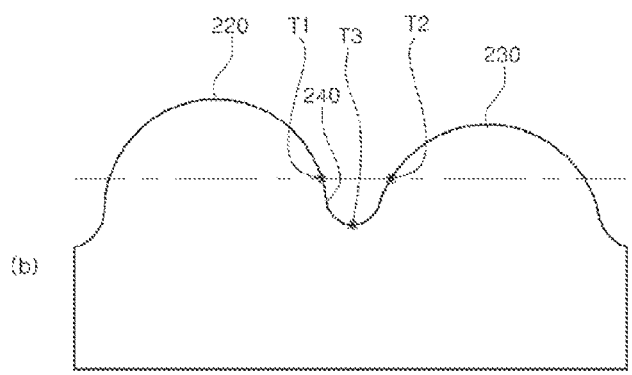
[FIG. 6]
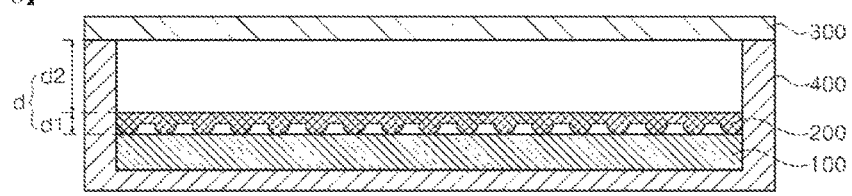

[FIG. 7]
(a)
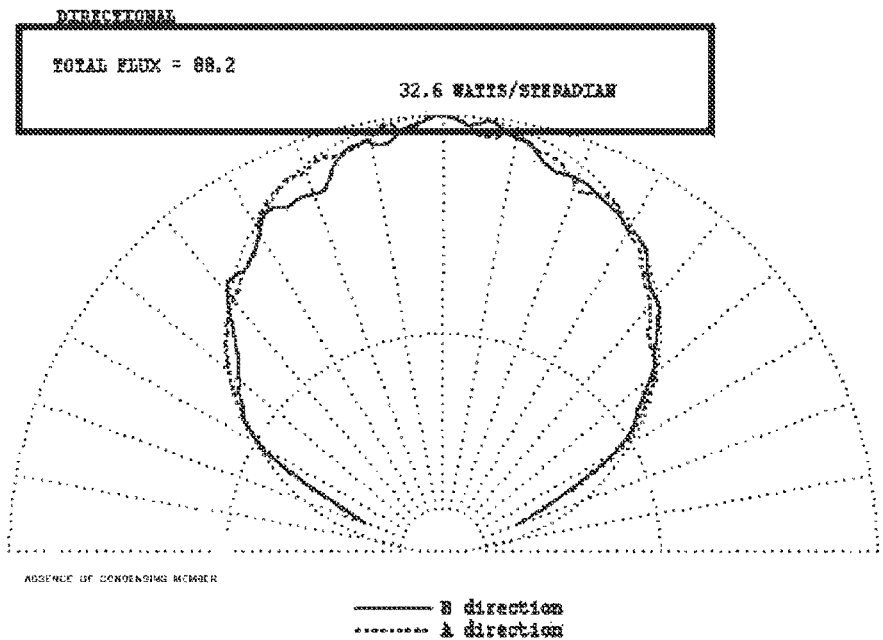
(b)
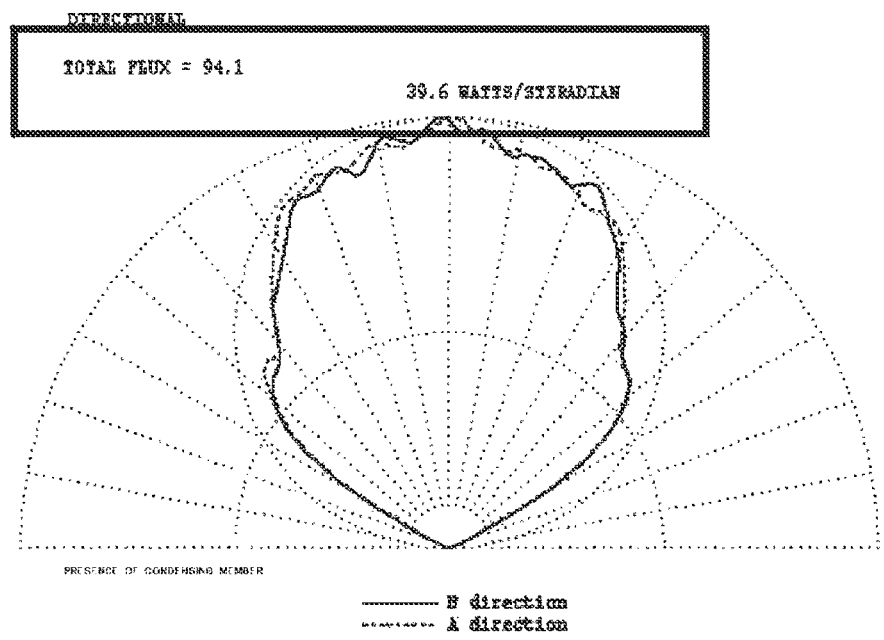

[FIG. 8]
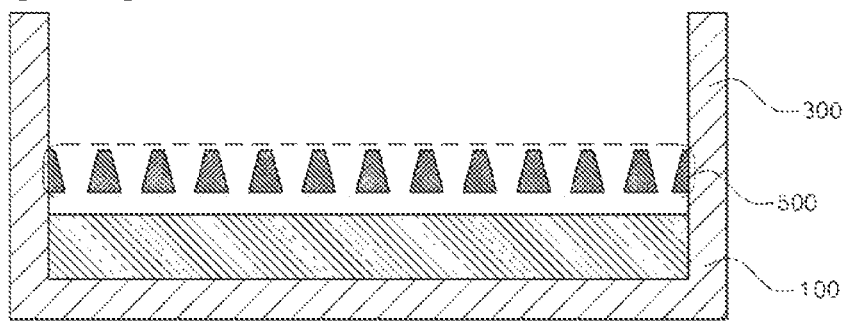
[FIG. 9]
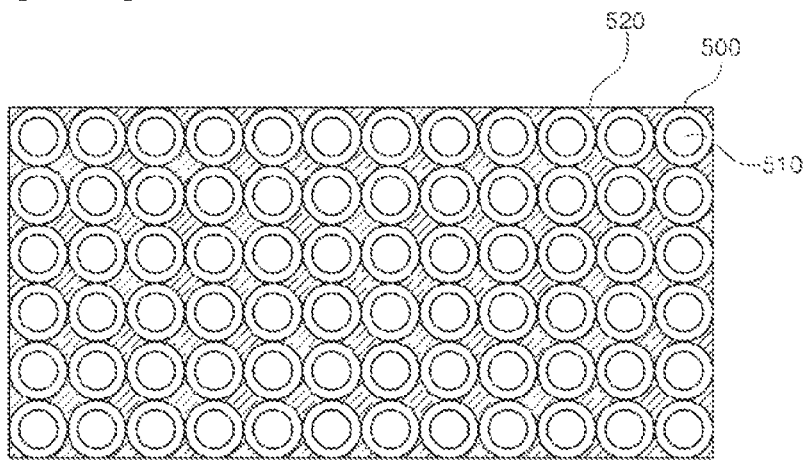

[FIG. 10]
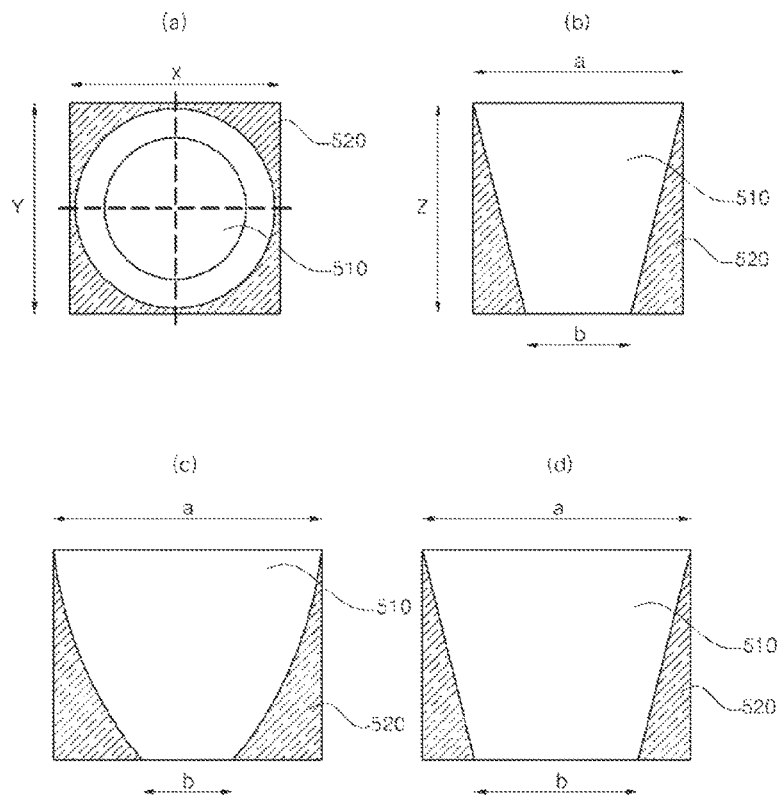
[FIG. 11]
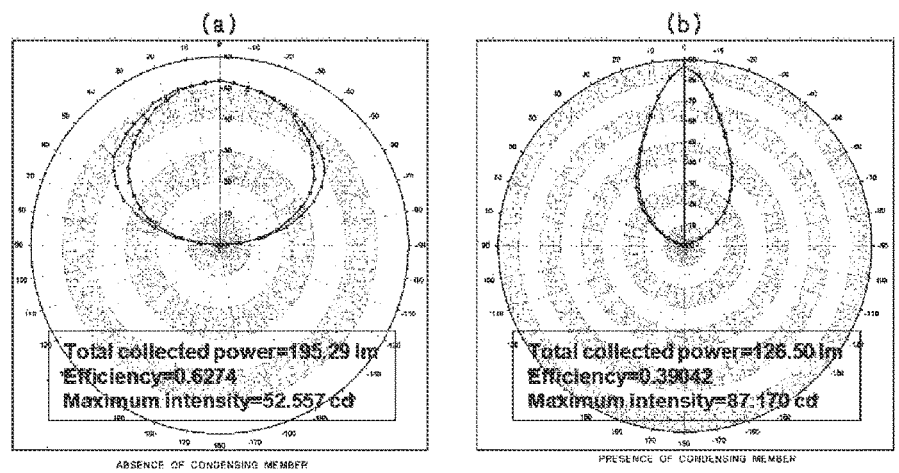

ILLUMINATING DEVICE AND VEHICLE LAMP COMPRISING SAME

CROSS-REFERENCE TO RELATED APPLICATIONS

This application is the U.S. national stage application of International Patent Application No. PCT/KR2013/008713, filed Sep. 27, 2013, which claims priority to Korean Application Nos. 10-2012-0108095, filed Sep. 27, 2012; 10-2012-0147655, filed Dec. 17, 2012; and 10-2012-0147656, filed Dec. 17, 2012 the disclosures of each of which are incorporated herein by reference in their entirety.

TECHNICAL FIELD

Embodiments of the present invention relate to an illuminating device capable of increasing light concentration efficiency.

BACKGROUND ART

A lighting unit in which various light sources used in electronic devices are utilized has been implemented in such a manner as to increase light efficiency by utilizing an appropriate light source according to each property of the electronic devices.

The lighting unit recently used in the electronic devices may be variously applied to a backlight unit applied to a flat display, an indoor light used in indoor environments, a headlight, a fog light, a backlight, a sidelight, a license plate light, a taillight, a stop light, a turn signal light, and a hazard flasher lamp installed at the outside of a vehicle, an indoor illumination lamp installed inside a vehicle, or the like.

However, the most of illumination is mainly realized by a method of increasing luminance of a surface light source by applying a member such as a light guide plate for enabling the efficient transmission of light.

However, in the case of a specific illuminating device such as an illuminating device for a vehicle which should meet the legal condition of the distribution of light, when the surface light source is applied to the device, it is difficult to adjust the distribution of light in implementing illumination realized by the conventional method of increasing luminance with the surface light source. In particular, since a light concentration level is reduced, there is a limit in applying the surface light source as illumination.

DISCLOSURE OF INVENTION

Technical Problem

The exemplary embodiments of the present invention have been made keeping in mind the above problems, and an object of the present invention is to provide an illuminating device that can adjust the distribution of light from a surface light source and can has an excellent light concentration function.

In particular, it is an object of the present invention to provide an illuminating device which is configured such that a light guide plate in a surface light source is removed so that an entire thickness can become thinner, light efficiency can be secured and a light concentration effect can be maximized in a vertical direction of the surface light source.

Solution to Problem

In order to accomplish the above objects, according to an aspect of the exemplary embodiments of the present invention, an illuminating device may include: a surface light emitting module including a light guide member disposed to bury a light source; and a condensing member on the surface light emitting module.

In particular, the illuminating device may be configured such that the condensing member is applied to a lens member having a plurality of optical patterns for condensing light, or a member having perforated optical patterns so that light concentration efficiency can be increased.

Advantageous Effects of Invention

According to the exemplary embodiments of the present invention, in order to implement an illuminating device capable of adjusting the distribution of light of a surface light source and having an excellent light concentration function, planar illumination is implemented by a condensing member so that a light concentration level can be maximized.

Also, planar illumination having an excellent stable light concentration function is implemented so that the number of LEDs can be reduced, and thus cost competitiveness can be secured.

Furthermore, a light shielding module having a bracket structure supporting a light source module accommodated in the light shielding module is implemented using a reflective material which shields one region of an upper portion of the light source module, and light emitting from a light source is reflected from a light shielding region to be concentrated on a condensing member, so that the intensity of light of a light emitting part can be increased.

In particular, since a surface: light emitting module according to some exemplary embodiment of the present invention is configured such that a light guide plate is removed, and light is guided using a resin layer, it is advantageous in that the number of light emitting units can be reduced, and an entire thickness of the illuminating device can become thinner.

Also, in forming the surface light emitting module according to some exemplary embodiment of the present invention, since a flexible printed circuit board and a resin layer are used, the illuminating device formed thereby can have flexibility, and the degree of freedom in a product design can be increased.

Also, reflective sheets and reflective patterns corresponding to structures capable of efficiently reflecting light emitted from the light emitting units are provided in the surface light emitting module according to some exemplary embodiment of the present invention so that light reflectance and luminance be maximally increased, and a uniform surface light source can be provided.

BRIEF DESCRIPTION OF DRAWINGS

FIGS. 1 and 2 are cross-sectional and conceptual views illustrating a main part of an illuminating device according to a first exemplary embodiment of the present invention;

FIGS. 3 to 5 are conceptual views of a main part illustrated for explaining the structure of a condensing member 200 illustrated in FIGS. 1 and 2;

FIG. 6 is a conceptual view illustrating the structure of a second exemplary embodiment including a light shielding module in which a surface light emitting module and a condensing member to be explained in the first exemplary embodiment are accommodated;

FIG. 7 is a graph illustrating a simulation experiment result for confirming a light concentration effect generated from planar illumination for a vehicle resulting from the presence or absence of a condensing member in a case where the illuminating device according to the first exemplary embodiment and the second exemplary embodiment is applied as an illuminating device for a vehicle;

FIG. 8 is a cross-sectional and conceptual view of a main part illustrated for explaining the structure of a third exemplary embodiment of the present invention;

FIGS. 9 and 10 are a plan concept view and a conceptual view of main part illustrating the condensing member according to the present invention; and FIG. 11 is a graph illustrating a simulation experiment result for confirming a light concentration effect generate from planar illumination resulting from the presence or absence of the condensing member by applying the third exemplary embodiment is applied.

DESCRIPTION OF THE REFERENCE NUMERALS

100: Surface light emitting module
110: Printed circuit board
120: Reflective member
130: Light source
140: Light guide member
150: First diffusion member
160: Optical pattern
161, 162: Optical sheet
200, 500: Condensing member
300: Second diffusion member
400: Light shielding module

BEST MODE FOR CARRYING OUT THE INVENTION

Hereinafter, the configuration and operation according to the present invention will be described in detail with reference to the accompanying drawings. With regard to the description with reference to the accompanying drawings, the same reference numerals are used throughout the different drawings to designate the same or similar elements. The repeated description of the components is omitted. It will be understood that, although the terms first, second, etc. may be used herein to describe various elements, these elements should not be limited by these terms. These terms are only used to distinguish one element from another.

The exemplary embodiments of the present invention may provide an illuminating device which is configured such that a surface light source is implemented wherein a condensing member capable of condensing light emitted from a surface light emitting module is applied so as to adjust a the distribution of light property of the surface light source, thereby providing planar capable of increasing light efficiency within the scope in which uniformity of the surface light source is lowered. In particular, when the illuminating device according to the exemplary embodiments of the present invention is applied to a vehicle lamp, it may be implemented as a planar illumination device for a vehicle which is configured such that a legal standard can be satisfied within the scope in which the uniformity of the surface light source is lowered, and at the same time, light efficiency can be increased.

1. First Exemplary Embodiment

FIGS. 1 and 2 are cross-sectional and conceptual views illustrating a main part of an illuminating device according to a first exemplary embodiment of the present invention.

Referring to FIGS. 1 and 2, an illuminating device according to a first embodiment of the present invention may include: a surface light emitting module 100 including a light guide member 140 intended for burying a light source 130: and a condensing member 200 on the surface light emitting module 100. In the present exemplary embodiment of the present invention, the condensing member 200 is disposed on the surface light emitting module 100 so that an effect for condensing light emitted from the surface light emitting module 100 can be maximized. That is, as the condensing member capable of condensing the light emitted from the surface light emitting module is provided, a the distribution of light property of the surface light source is adjusted so that a legal standard can be satisfied within the scope in which uniformity of the surface light source is lowered, and at the same time, light efficiency can be increased. Thus, the illuminating device can be used in various kinds of illumination such as planar illumination for a vehicle.

The surface light emitting module 100 includes at least one light source 130 and the light guide member 140 formed to bury the light source. In particular, the surface light emitting module 100 may basically include a printed circuit board 110 for mounting the light source 130. In such a case, the printed circuit board 110 means a board in which a circuit pattern is formed on a substrate, namely, a printed circuit board (PCB). In the present invention, it is preferable to use the printed circuit board 110 made of a transparent material. In the case of a conventional illuminating device, as an FR4 printed circuit board is used, the conventional illuminating device is opaque, whereas in the present invention, as the printed circuit board made of a transparent material, in particular, the transparent PET printed circuit board is used, the transparent illuminating device can be provided. Also, in the present invention, a flexible printed circuit board may be used for securing fixed flexibility.

The light source 130 constituting e surface light emitting module 100 is an element emitting light configured such that at least one light source is arranged on the printed circuit board 110. The light source 130 may be composed of a side view type light emitting diode. That is, the light emitting diode having a structure in which light is emitted toward a side rather than being straightly emitted upwards may be used as the light source 130 of the present invention. Accordingly, in the illuminating device of the present invention, the light source 130 composed of the side view type light emitting diode disposed in a direct type, and a resin layer capable of implementing a light diffusion and reflection function, which will be described later, is utilized for diffusing and guiding light in an upward direction, so that the number of light sources can be reduced and an entire weight and thickness of the illuminating device can be remarkably reduced.

Also, the light guide member 140 disposed on the printed circuit board 110 is provided at an upper portion of the printed circuit board 110, thereby diffusing and guiding the light emitted from the light source 130. The light guide member 140 may be a conventional light guide plate or a resin layer for replacing the light guide plate.

Also, a reflective member 120 may be further included between the printed circuit board 110 and the light guide member 140. In this case, the reflective member 120 is formed on an upper surface of the printed circuit board 110 and has a structure in which the light source 130 is formed to pass through the reflective member. The reflective member 120 is made of a material having high reflection efficiency so as to reflect the light emitted from the light source 130 to an upper portion where a second diffusion member 150 is positioned, thereby functioning to reduce optical loss. Such a reflective member 120 may have a film form and may be formed using a synthetic resin dispersively containing a white pigment. For example, examples of the white pigment may include, not being limited to a titanium dioxide, an aluminum oxide, a zinc oxide, a lead carbonate, a barium sulfate, calcium carbonate, and the like, and examples of the synthetic resin may include, not being limited to, polyethylene terephthalate, polyethylene naphthalate, acrylic resin, polycarbonate, polystyrene, polyolefin, cellulose acetate, weather resistant vinyl chloride, and the like. Reflective patterns 121 may be formed on a surface of the reflective member 120 and may function to uniformly transmit light to the second diffusion member 150 by scattering and diffusing the incident light. The reflective patterns may be formed by printing the reflective patterns on the surface of the reflective member 120 using a reflective ink containing any one of $TiO_2$, $CaCo_3$, $BaSO_4$, $Al_2O_3$, Silicon, and PS without being limited thereto. Also, the reflective member 120 may be formed using a transparent PET instead of a film. Also, the reflective patterns nay have a structure in which a plurality of protruding patterns are provided and may be formed in a dot pattern form, a prism form, a lenticular form, a lens form, or a combination thereof without being limited thereto. Also, a sectional form of each reflective pattern may have various shapes such as a triangular shape, a quadrangular shape, a semi-circular shape, a sine wave-like shape, and the like.

The resin layer as a light guide member may be applied as the light guide member 140 according to the present exemplary embodiment of the invention. In such a case, the resin layer is closely applied to an entire surface of the light source 130, thereby burying the light source. When the light guide member 140 is formed as the resin layer, the resin layer diffuses and guides the light emitted from the light source 130 forward. That is, the resin layer is formed to bury the light source 130, thereby functioning to disperse the light emitted from the light source 130 to a lateral direction. That is, the resin layer can perform the function of the conventional light guide plate.

Such a resin layer of the present invention may be made of a resin material which can basically diffuse light. For example, the resin layer of the present invention may be made of an ultraviolet curing resin containing an oligomer. More specifically, the resin layer may be made of a resin containing a urethane acrylate oligomer as a main raw material. For example, a resin in which the urethane acrylate oligomer corresponding to a synthetic oligomer and a polyacrylic polymer are mixed may be used. Of course, the resin layer may further include a monomer corresponding to a low boiling point and diluted type reactive monomer in which IBOA (isobornyl acrylate), HPA (hydroxylpropyl acrylate), 2-HEA (2-hydroxyethyl acrylate) and the like are mixed. Also, a photo initiator (for example, 1-hydroxycyclohexyl phenyl-ketone and the like), or an antioxidant may be further mixed as an additive. However, the foregoing is only one example, and in addition to these materials, the resin layer may be formed using all resin materials capable of performing a light diffusing function, which have been developed and commercialized or can be implemented according to technical development in the future.

Meanwhile, the resin layer of the present invention may further include a plurality of light diffusers in which pores (or air gaps) are formed. As one example of the light diffusers, the beads in which pores are formed may be implemented in a mixed and diffused form. In addition to this, particles resulting from granulating a diffusion material may be used as the light diffusers. The light diffusers 141 functions to increase a light reflecting and diffusing property. For example, when the light emitted from the light source 130 enters the light diffusers 141 inside the resin layer, the light is reflected and transmitted by the pores of the light diffusers 141, so the light is diffused and condensed, and is then emitted upwards. At this time, a reflectance and diffusion coefficient of the light is increased thanks to the light diffusers 141 so that uniformity and an amount of the emitted light can be increased, and as a result, luminance of the illuminating device can be improved.

When the light diffusers 141 are formed as beads in which pores are formed, a content of the beads may be appropriately adjusted for obtaining a desired light diffusing effect. More specifically, the content of the beads may be adjusted within a range of 0.01 to 0.3% compared to a total weight of the resin layer without being limited thereto. That is, the light emitted from the light source to the lateral direction is diffused and reflected through the resin layer and the beads, thereby traveling upwards. These beads may be made of any one selected from among silicon, silica, glass bubble, PMMA (Polymethyl Methacrylate), urethane, Zn, Zr, $Al_2O_3$, and acryl, and a particle diameter of the beads may be formed in a range of 1~20 μm without being limited thereto.

According to the present exemplary embodiment of the invention, thanks to the presence of the resin layer, since a thickness occupied by the conventional light guide plate can be remarkably reduced, the entire product can be implemented in a slimming structure. Furthermore, it is advantageous in that thanks to a flexible property, a curved surface can be easily applied, the degree of freedom in a design can be improved, and the illuminating device can be also applied to other flexible displays.

Also, the light source module 100 according to the present invention may be formed in a structure in which an optical pattern layer 160 is disposed at an upper portion of the light guide module 140. The optical pattern layer 160 may be formed on the surface of the light guide member 140 or may be formed on a surface of a transparent optical sheet 161. Also, as shown in the structure of FIG. 2, optical patterns 164 may be formed between a pair of optical sheets (161, 162).

The optical pattern layers 160 basically function not to concentrate the light emitted from the light source 130. The optical pattern layer 160 may be formed with light shielding patterns so that a light shielding effect can be implemented to some degree, thereby preventing an optical property from being reduced due to excessively strong intensity of the light, or a yellowish effect from being generated. The light shielding pattern may be formed by printing the pattern on an upper surface of the light guide member 140 or printing the pattern on an upper surface of a lower surface of the optical sheet using a light shielding ink.

The optical patter is 164 included in the optical pattern layer 160 may be implemented so that a light shielding and diffusing degree can be adjusted by one optical pattern, thereby functioning to partially shield and diffuse light rather than functioning to completely shield the light. Furthermore, more specifically, each of the optical patterns 164 may be implemented in an overlapping print structure of composite patterns. The overlapping print structure means a structure implemented by forming one pattern and printing another pattern thereon. As one example, the optical pattern 164 may be implemented in an overlapping structure of a diffusion pattern and a light shielding pattern wherein the diffusion pattern is formed on a lower surface of a polymeric film in a light emitting direction using a light shielding ink containing at least one material selected from among $TiO_2$, $CaCO_3$, $BaSO_4$, $Al_2O_3$, and Silicon, and the light shielding pattern is formed using a light shielding ink containing Al, or a mixture material of Al and $TiO_2$. That is, the optical pattern may be implemented such that the diffusion pattern is white-printed on the surface of the polymeric film, and thereafter, the light shielding pattern is formed thereon, or the optical pattern may be formed in a double structure in an order opposite thereto. Of course, it would be obvious that the design forming the optical pattern may be variously changed in consideration of the efficiency and intensity of light, and a light shielding rate. Also, the optical pattern may be formed in a tripe structure in which, in such a sequential layer structure, the light shielding pattern corresponding to a metal pattern is formed in a middle layer, and the diffusion pattern is implemented at an upper portion and a lower portion thereof, respectively. In such a triple structure, the optical pattern may be implemented by selecting the aforesaid materials. As one preferred example, through the triple structure in which one diffusion pattern of the diffusion patterns is implemented using $TiO_2$ having an excellent refractive index and the other diffusion pattern is implemented using $CaCO_3$ and $TiO_2$ together having excellent optical stability and the excellent feeling of color, and the light shielding pattern is implemented using Al having excellent shielding property, efficiency and uniformity of the light can be secured. In particular, $CaCO_3$ may perform a function of finally implementing white light thanks to its function of reducing the exposure of yellowish light so that light efficiency can be more stably implemented. In addition to $CaCO_3$, inorganic materials having a similar structure and a large particle size such as $BaSO_4$, $Al_2O_3$, silicon beads and the like may be utilized. Moreover, in terms of light efficiency, it is preferable to form the optical pattern 164 by adjusting a pattern density so that the pattern density can be reduced as the pattern is gradually far away from a light emitting direction of the LED light source.

In particular, as illustrated in FIG. 2, in the present exemplary embodiment of the invention, the optical patterns 164 included in the optical pattern layer 160 are configured so that spaced parts 163 forming air layers can be formed around the optical patterns. To do so, the optical patterns may be implemented in a structure in which a pair of optical sheets 161, 162 are adhered using adhesive members 165. Thanks to presence of the spaced parts 163, the air layers having different refractive indexes are formed around the optical patterns so that light scattering efficiency can be increased. A sheet made of a transparent material haying excellent light transmittance may be applied as the optical sheet. As one example, PET may be used as the material. Moreover, the adhesive member 165 may be formed using a heat curing PSA, a heat curing adhesive, and a UV curing PSA type material.

Moreover, as an example of the present invention, in the structure of FIG. 1, the second diffusion member 150 and the light guide member 140 may be disposed in a structure in which a spaced part 170 is formed between the second diffusion member and the light guide member. The spaced part 170 may enable an increase in the uniformity of supplied light, and as a result, uniformity of diffused and emitted light may be increased. At this time, in order to minimize the deviation of fight passing through the light guide member 140, a thickness H1 of the spaced part 170 may range from more than 0 mm to 20 mm. When the thickness is beyond the range of 20 mm, light diffusing efficiency is reduced.

As shown in the structure illustrated in FIGS. 1 and 2, in the structure of the first exemplary embodiment according to the present invention, the condensing member 200 is disposed at an upper portion of the light guide member 140 so that light concentration efficiency can be increased.

The condensing member 200 may be implemented such that a lens pattern is provided on a base substrate, thereby condensing the light emitted from the surface light emitting module 100. Also, a first diffusion member 150 is included at a lower portion of the condensing member 200 so that the uniformity of light incident to the condensing member 200 can be increased FIGS. 3 to 5 are conceptual views of a main part illustrated for explaining the structure of the condensing member 200 illustrated in FIGS. 1 and 2.

The condensing member 200 has a structure in which optical patterns 220 are forded on a base member 210. Furthermore, it is preferable that the condensing member be made of a light transmitting material having a refractive index ranging from 1.3 to 1.7 this range, as the refractive index increases gradually, light concentration efficiency increases. When the refractive index is less than 1.3, light concentration efficiency is largely reduced, and when the refractive index is more than 1.7, light concentration efficiency is increased, but light efficiency (the distribution of light) is entirely reduced. Any one selected from among PMMA (Polymethyl Methacrylate), PS (Polystyrene), a COC (Cyclic Olefin Polymer), PET (Polyethylene Terephthalate), acrylic resin, urethane acrylate, epoxy acrylate, polyester acrylate, polyether acrylate, polybutadiene acrylate, silicon acrylate, polyethylene naphthalate, polycarbonate, polyolefin, cellulose acetate, weather resistant vinyl chloride, and an active energy ray-curable resin may be applied as a material of such a condensing member.

FIGS. 4 and 5 are conceptual views showing one example of the main part of the condensing member 200 according to the present invention.

As illustrated in FIG. 4, the condensing member according to the present invention is integrally formed with the surface of the base substrate 210 or optical patterns are detachably adhered to the surface of the base substrate 210 and are independently formed. The optical patterns may have uniform size and shape or the optical patterns having different sizes and shapes may be combined and disposed.

As one example, as illustrated in FIG. 4, even when hemispherical lens patterns having a protruding structure are formed on an upper surface X of the base substrate 210, they may be implemented as lens patterns having different sizes. In the case of a shape of the lens patterns, each vertical section of the lens patterns may be implemented in any one shape of a semi-circular shape, a semielliptical shape, a prism-like shape, a lenticular shape, and an R-prism-shape. In particular, in order to increase light concentration efficiency, each of the lens patterns may be formed to have a sag (height lens diameter R) ranging from 0.01 to 0.9. As the sag of the respective lens patterns increases gradually to a fixed level in the range above, light concentration efficiency increases. However, when the sag is beyond the range above, light concentration efficiency or entire the distribution of light reduces.

FIG. 5 illustrates modified examples showing the structure of the condensing member of FIG. 4.

The structure illustrated FIG. 5 shows that an engraved bent part having curvature may be formed in a space between adjacent lens patterns 220, 230.

As illustrated in (A) and (B) of FIG. 5, a bottom surface in a space between the lens patterns according to the present invention may have a flat structure in which a curve is not formed, or may be implemented in a structure in which a flat bottom surface is not present in a space between the lens patterns by forming the lens patterns to be adjacent to each other.

However, when the flat bottom surface is present between the lens patterns, light incident to the condensing member passes through the bottom surface in a relative long straight form, so that the emitted light becomes non-uniform (bright line). In order to increase the uniformity of condensed light, according to the present invention, the condensing member may ensure light concentration efficiency and luminance by adjusting the sag of each lens pattern and may be implemented so as to increase light efficiency by providing an engraved bent part in a space between the respective lens patterns.

When the space between the adjacent lens patterns 220, 230 is formed to be in contact with a virtual ellipse having a virtual major axis 'a' in a vertical direction and a virtual minor axis 'b' in a horizontal direction, the space contacts a first lens contact T1, a second lens contact T2, and a bottom contact T3 in contact with the respective lens pattern, and the lens pattern 220 is filled in a remaining space except for the virtual ellipse and the bottom portion so that an engraved bent part 240 having curvature and passing through the first lens contact and the second lens contact can be formed.

The virtual ellipse may have a spherical shape by adjusting a, length of the major axis 'a' and a length of the minor axis 'b'. Each length of the major axis and the minor axis may be adjusted in the range of 0.1~1000 μm. When each length is beyond the numerical range, it is difficult for condensing lens patterns to substantially satisfy light concentration efficiency.

2. Second Exemplary Embodiment

FIG. 6 is a conceptual view illustrating a structure of the second exemplary embodiment further including a light shielding module 400 in which the surface light emitting module and the condensing member described in the first exemplary embodiment are accommodated.

According to the second exemplary embodiment, the illuminating device may include the surface light emitting module 100 and the condensing member 200 of the first exemplary embodiment of the present invention, and in particular, the illuminating device may further include the light shielding module 400 in which the surface light emitting nodule 100 and the condensing member 200 are accommodated. In such a case, a second diffusion member 300 intended for diffusing condensed light may be disposed on an upper surface of the condensing member 200. The surface light emitting module 100 and the condensing member 200 may be mounted to be accommodated in the light shielding module 400 having an opening region at an upper portion thereof and having a bracket structure. Moreover, as illustrated in FIG. 6, the diffusion member 300 may be disposed on an upper surface or at an inner side of the light shielding module 400. The light shielding module 400 may be made of a material including any one of Al, PC, PP, ABS, and PBT. This is intended to reflect light emitted from the surface light emitting module 100 and transmit the light to the condensing member 300, thereby enabling the diffusion and concentration of light.

The surface light emitting module 100 emits light via the light guide member for causing surface light emitting from a light emitting region, and the emitted light is condensed by the condensing member 200 disposed at an upper portion. The condensing member 200 may be intended to increase light concentration efficiency by forming the optical patterns for condensing light, the optical patterns being integrally formed with or being detachably formed to the base substrate having light transmittance.

As the condensing member 200 is gradually close to the surface light emitting module 100, light concentration efficiency increases. With regard to the range of a volume, considering a spaced distance d between the diffusion plate 300 and the surface light emitting module 100, as illustrated in FIG. 6, it is more preferable in terms of light concentration efficiency that the condensing member be disposed on the uppermost surface of the surface light emitting module 100 within a distance d1 corresponding to ¾ of the spaced distance d.

FIG. 7 is a graph illustrating a simulation experiment result for confirming a light concentration effect generated from planar illumination for a vehicle resulting from the presence or absence of a condensing member in a case where the illuminating device according to the first exemplary embodiment and the second exemplary embodiment is applied as an illuminating device for a vehicle.

In the structure of FIG. 6, (a) entire light emitting efficiency and the intensity of light resulting from (a) absence of the condensing member, and (b) presence of the condensing member were measured. The condensing member having a refractive index of 1.5, and the optical pattern formed in the condensing member as a micro lens pattern and having a sag of 0.5 were used.

As a result, comparing light condensing levels resulting from (a) the absence of the condensing member, and (b) the presence of the condensing member, as can be confirmed through the graph of (b) resulting from the addition of the condensing member, it could be confirmed that the high intensity of light (39.6 Watt/steradian) is generated in directions intended for condensing light (within 20° from the center to A and B directions).

Through the above results, it can be seen that the presence of the condensing member n the planar illumination for a vehicle according to the present invention results in the increase of light concentration efficiency, and an light concentration effect increases according to an increase of the refractive index of the condensing member and an increase of each sag of the optical patterns.

3. Third Exemplary Embodiment

FIG. 8 is a cross-sectional and conceptual view of a main part illustrated for explaining the structure of a third exemplary embodiment of the present invention.

The third exemplary embodiment results from modifying the structure of the condensing member from the structure of the second exemplary embodiment The same reference numeral of the condensing member is used to designate the same element.

The third exemplary embodiment results from changing the structure of the condensing member in the structure of the second exemplary embodiment. The reference numeral of the condensing member corresponding to the same element Referring to FIG. 8, an illuminating device according to the third exemplary embodiment of the present invention includes: a surface light emitting module 100 including a light guide member disposed to bury a plurality of light sources: and a condensing member 500 having perforated optical patterns intended for condensing light emitted from surface light emitting nodule. In this case, a diffusion member intended for diffusing the condensed light may be disposed at an upper portion of the condensing member 200. The surface light emitting module 100 and the condensing member 500 may be mounted to be accommodated in a light shielding module 300 having an opening region at an upper portion thereof and having a bracket structure. The light shielding module 300 may be made of a material including any one of Al, PC, PP. ABS, and PBT. This is intended to reflect light emitted from the surface light emitting module 100 and transmit the light to the condensing member 500, thereby enabling the diffusion and concentration of light. Since the configuration of the surface light emitting module 100 and the light shielding module 400 is identical to that of the aforesaid exemplary embodiment, the description will be hereinafter performed based on the modified structure of the condensing member.

The condensing member 500 may be configured such that a plurality of through holes intended for condensing light is formed on a base member so that light concentration intensity can be increased by transmitting only light rays penetrating the through holes upwards.

FIGS. 9 and 10 are a plan concept view and a conceptual view of a main part illustrating the condensing member 500 according to the third exemplary embodiment of the present invention.

Referring to FIG. 9, the condensing member 500 according to the third exemplary embodiment of the present invention includes: a condensing pun including a plurality of condensing holes 510 through which the light emitted from the surface light emitting module passes and which is formed on the base substrate 510; and a light shielding part 520 intended for shielding light to the remaining region except for the condensing holes. The condensing part refers to the plurality of condensing holes 510, and the light shielding part 520 refers to a region intended for preventing the light from being transmitted to the remaining region except for a region in which the condensing holes are formed.

FIG. 10 illustrates one example for a structure of the condensing holes 510 of FIG. 9. Each of the condensing holes 510 may be basically formed such that a diameter of an incident part of the condensing hole adjacent to a direction of the surface light emitting module is less than a diameter of an emission part opposite to the incident part. This is intended to intensively form light concentration intensity. That is, in FIG. 10, comparing the diameter of an inlet b formed on a surface of the condensing member adjacent to the surface light emitting unit 100 with the diameter of an outlet a formed on an opposite surface of the condensing member, as illustrated in (B) of FIG. 10, the diameter of the outlet a formed on the opposite surface of the condensing member may be identical to, or may be formed larger than the diameter of the inlet b.

The structure of the condensing holes 510 may be changed and designed in various shapes and sizes according to the distribution of light, and the section of each hole ay also have non-stereotyped various shapes (single closed curve), as well as a circular shape, an elliptical shape, and a polygonal shape.

Also, as previously described, an area ratio of an upper surface and a lower surface of each condensing hole 510 may be variously designed according to light efficiency and condensing distribution. In consideration of a longitudinal section or a cross section of the condensing hole, the condensing hole may also have a symmetrical shape or an asymmetrical shape. Moreover, as shown in (C) of FIG. 10, an inclined surface of an inner surface of the condensing hole may have a straight-lined shape, a curved line-like shape, a parabolic shape and the like, and as shown in (D) of FIG. 10, the sectional shape of the condensing hole may be variously changed and designed.

The condensing holes 510 according to the third exemplary embodiment of the present invention may be formed to concentrically penetrate light in only a desired specific site, thereby increasing light concentration intensity.

In particular, the condensing member 500 may be made of a material having high reflectance. This is intended to increase efficiency for light utilization by reflecting light, which is emitted from the surface light emitting module 100 in the structure of FIG. 8 but does not penetrate the condensing holes, again and by guiding the light to the condensing holes. To do so, the condensing member may be made of a material containing any one of Al, PC, PP, ABS, PBT, and Ag. Also, the condensing member may be made of a resin or metal having a solar interception property and may be formed in a structure in which a reflective material layer is applied to one surface of the condensing member facing a light emitting surface of the surface light emitting module 100. In such a case, the reflective material layer may be made of any one material selected among $TiO_2$, $CaCO_3$, $BaSO_4$, $Al_2O_3$, Silicon, PS, and Ag.

FIG. 11 is a graph illustrating a simulation experiment result for confirming a light concentration effect generated from planar illumination resulting from the presence or absence of the condensing member by applying the third exemplary embodiment is applied.

(A) of FIG. 11 shows a result of applying only the surface light emitting unit 100 of FIG. 8, and (B) of FIG. 11 illustrates a result of disposing the condensing member 500 according to the present exemplary embodiment of the invention at an upper portion of the surface light emitting unit 100. As the results, when the condensing member is installed on the surface light emitting unit, a total light efficiency was reduced from 67.2% to 39.0%, and a maximum light concentration intensity value was increased from 52.6 cd to 87.2 cd, and accordingly, it could be confirmed that the light concentration intensity value is rapidly increased by about 66% compared to a case before installing the condensing member.

Through the results, it can be seen that the presence of the condensing member with regard to the planar illumination according to the present invention can result in an increase of light concentration efficiency, and the distribution of light can be controlled by adjusting the shape of the condensing holes of the condensing member so that a light concentration effect can be increased.

The illuminating device according to various exemplary embodiments of the present invention can be applied to various lamp devices such as a vehicle lamp, a home illuminating device, an industrial illuminating device and the like. For example, when the illuminating device is applied to the vehicle lamp, it can be also applied to a headlight, a vehicle indoor light, a door scuff, a backlight and the like. Additionally, the illuminating device according to various exemplary embodiments of the present invention can be applied to a backlight unit field applied to a liquid crystal display device and can be also applied to all fields regarding illumination which have been developed and commercialized or may be implemented according to technical development in the future.

As previously described, in the detailed description of the invention, having described the detailed exemplary embodiments of the invention, it should be apparent that modifications and variations can be made by persons skilled without deviating from the spirit or scope of the invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims and their equivalents.

What is claimed is:

1. An illuminating device, comprising:
a surface light emitting module including a light guide member disposed to bury at least one light source and a first diffusion member disposed on the light guide member;
a condensing member disposed on the surface light emitting module;
a light shielding module in which the surface light emitting module and the condensing member are accommodated, and an upper portion of which is open; and
an optical pattern layer disposed between the first diffusion member and the light guide member;
wherein the surface light emitting module comprises a printed circuit board, a reflective member disposed on the printed circuit board, a plurality of reflective patterns disposed on the reflective member, and the light guide member disposed on the reflective member so that the plurality of reflective patterns are embedded;
wherein the at least one light source is a side view type emitting diode that is disposed on the printed circuit board and passes through the reflective member,
wherein the condensing member comprises a base substrate and a plurality of lens patterns disposed on a surface of the base substrate,
wherein the optical pattern layer comprises a plurality of optical patterns and a plurality of spaced parts forming air layers around the optical patterns, and
wherein a pattern density of the optical patterns is gradually reduced as the optical patterns are gradually spaced apart from a light emitting direction of the at least one light source.

2. The illuminating device of claim 1, wherein each of the lens patterns has a sag of 0.01 to 0.9 (where the sag is defined as a height of the lens pattern (H) to a diameter of the lens pattern (R)).

3. The illuminating device of claim 1, wherein each of the lens patterns for condensing light has an engraved bent part having curvature and provided in a space between adjacent lenses.

4. The illuminating device of claim 3, wherein the space between the adjacent lens patterns is formed to be in contact with a virtual ellipse having a virtual major axis in a vertical direction and a virtual minor axis in a horizontal direction; the space contacts a first lens contact point, a second lens contact point, and a bottom contact point in contact with the respective lens pattern; and the lens pattern is filled in a remaining space except for the virtual ellipse and the bottom portion so that an engraved bent part having curvature and passing through the first lens contact and the second lens contact is formed.

5. The illuminating device of claim 1, wherein the condensing member comprises: a condensing part including a plurality of condensing holes through which light emitted from the surface light emitting module passes; and a light shielding part intended for shielding the light to a remaining region except for the condensing holes.

6. The illuminating device of claim 5, wherein the condensing holes are formed such that a diameter of an incident part of the condensing hole adjacent to a direction of the surface light emitting module is less than a diameter of an emission part opposite to the incident part.

7. The illuminating device of claim 6, wherein the condensing member further comprises a reflective material layer on one surface of the condensing member facing a light emitting surface of the surface light emitting module.

8. The illuminating device of claim 1, wherein the printed circuit board is a flexible printed circuit board.

9. The illuminating device of claim 1, wherein the optical pattern layer further comprises a first optical sheet that is disposed on the light guide member and a second optical sheet,
wherein the plurality of optical patterns and the plurality of spaced parts are disposed between the first optical sheet and the second optical sheet.

10. The illuminating device of claim 9, wherein the optical patterns are disposed under a bottom surface of the second optical sheet and on a top surface of the first optical sheet.

11. The illuminating device of claim 1, wherein each of the optical patterns is formed in an overlapping structure of a diffusion pattern and a light shielding pattern, the diffusion pattern being fainted using a light shielding ink containing at least one material selected from among $TiO_2$, $CaCO_3$, $BaSO_4$, and silicon, and the light shielding pattern being formed using a light shielding ink containing Al, or a mixture of Al and $TiO_2$.

12. The illuminating device of claim 1, wherein the light guide member is an ultraviolet curing resin containing an oligomer.

13. A vehicle lamp, comprising an illuminating device of claim 1.

14. The illuminating device of claim 1, further comprising a first air gap disposed between the first diffusion member and the optical pattern layer.

15. The illuminating device of claim 14, wherein a thickness of the first air gap has a range from more than 0 mm to 20 mm.

16. The illuminating device of claim 1, wherein each of the plurality of optical patterns is disposed at a position overlapping the light source in a direction perpendicular to the printed circuit board.

* * * * *